United States Patent [19]

Humbel et al.

[11] Patent Number: 4,969,737
[45] Date of Patent: Nov. 13, 1990

[54] EXPANDED FOUCAULT KNIFE-EDGE TEST FOR QUANTITATIVELY TESTING AN OPTICAL IMAGING DEVICE

[75] Inventors: William D. Humbel, Rochester; Donald E. Vandenberg, Brockport; John G. Pitek, Rochester; Thomas W. Dey, Springwater, all of N.Y.

[73] Assignee: Eastman Kodak Company, Rochester, N.Y.

[21] Appl. No.: 485,182

[22] Filed: Feb. 27, 1990

[51] Int. Cl.⁵ .............................................. G01B 9/00
[52] U.S. Cl. .................................................. 356/124
[58] Field of Search ................ 356/124, 125, 127, 129

[56] References Cited

PUBLICATIONS

Hariharan et al, "Quantitative Application of the Foucault Test to Objective Lenses", *Journal of Scientific Instruments*, vol. 33, Dec. 1956, p. 506.

*Primary Examiner*—F. L. Evans
*Attorney, Agent, or Firm*—Stephen C. Kaufman

[57] ABSTRACT

The historical Foucault knife-edge test enables one to qualitatively ascertain an optical imaging device's characteristics, for example, whether or not it is a source of optical aberrations. The novel method of the present invention, in sharp contrast, complements the historical Foucault knife-edge test, by expanding the test so as to develop a quantitative interpretation of the imaging device's characteristics.

4 Claims, 6 Drawing Sheets

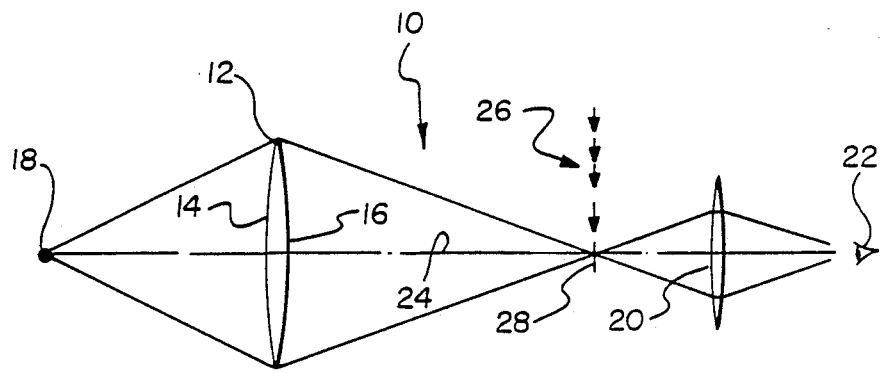
FIG. 1
(PRIOR ART)
FIG. 2A 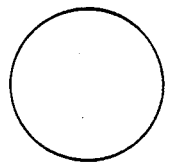 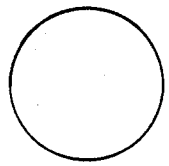 FIG. 3A
FIG. 2B 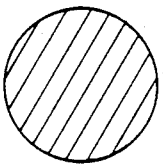 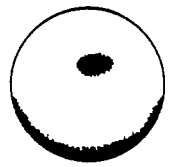 FIG. 3B
FIG. 2C 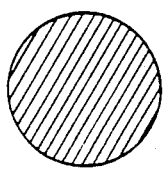  FIG. 3C
FIG. 2D 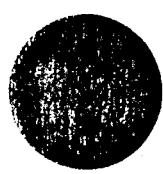 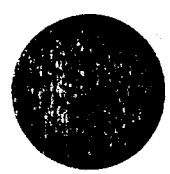 FIG. 3D

SAMPLE SPACE CONJUGATE SAMPLE SPACE

FIG. 6
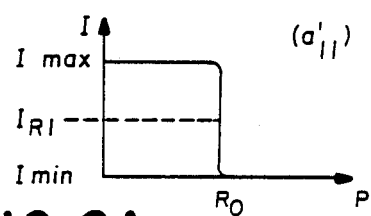
FIG. 6A
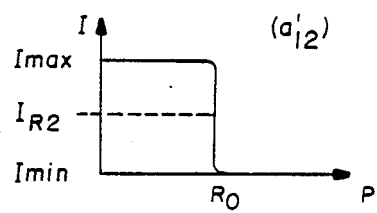
FIG. 6B
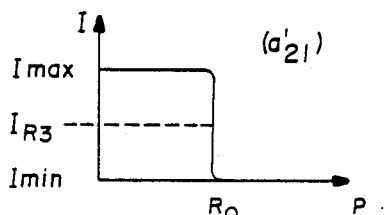
FIG. 6C
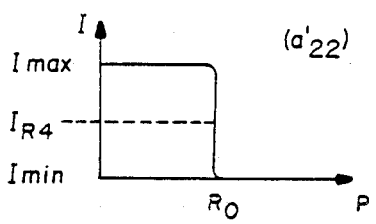
FIG. 6D
FIG. 7
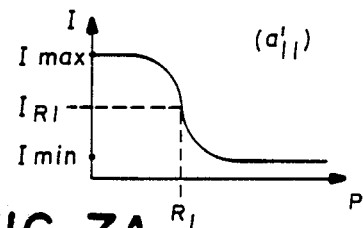
FIG. 7A
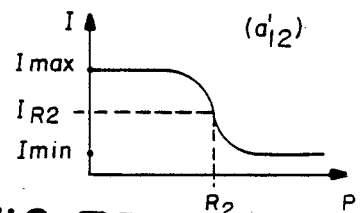
FIG. 7B
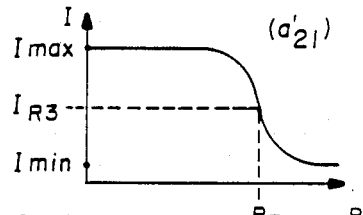
FIG. 7C
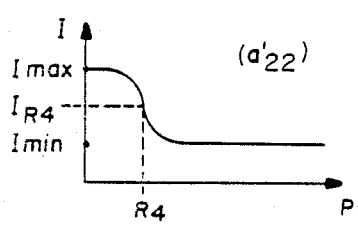
FIG. 7D

FIG. 8
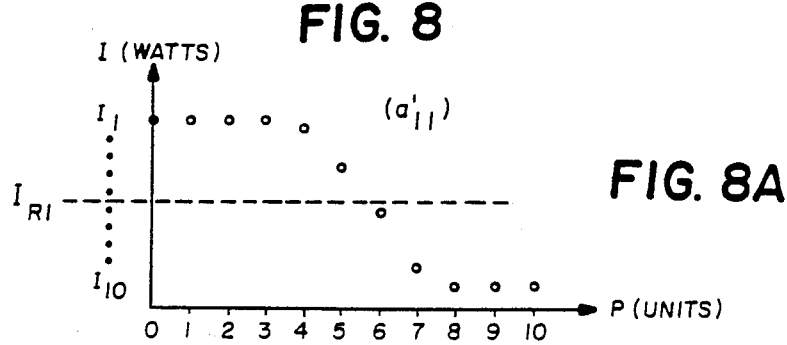
FIG. 8A
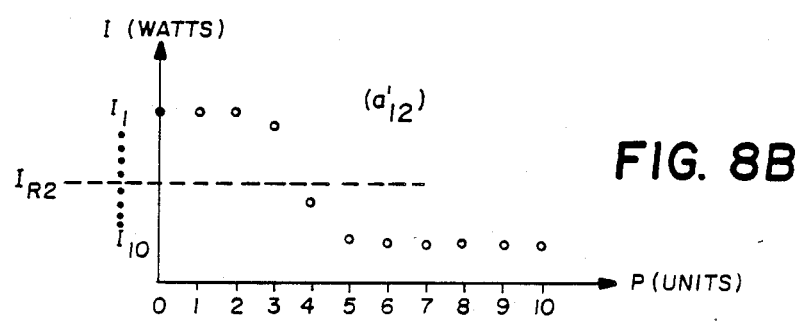
FIG. 8B
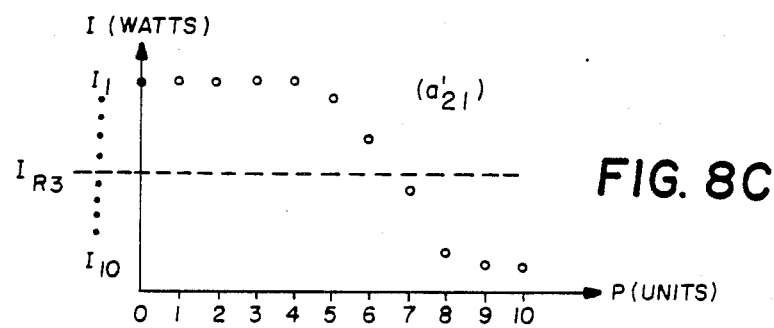
FIG. 8C
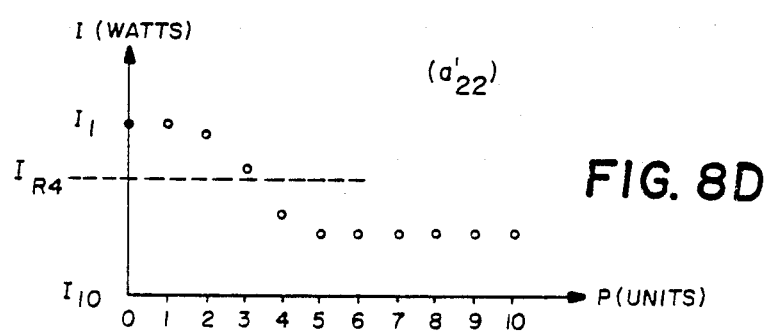
FIG. 8D

EXPANDED FOUCAULT KNIFE-EDGE TEST FOR QUANTITATIVELY TESTING AN OPTICAL IMAGING DEVICE

CROSS REFERENCE TO RELATED APPLICATIONS

This application is related to U.S. application Ser. No. 07/464,278 filed Jan. 12, 1990, by Vandenberg et al; to U.S. application Ser. No. 07/464,042 filed Jan. 12, 1990 by Pitek et al; and, to U.S. application Ser. No. 07/485,413 filed Feb. 27, 1990 by Dey et al, which is being filed contemporaneously with this application. The entire disclosures of each of these applications are incorporated by reference herein. Each of these applications is copending and commonly assigned.

FIELD OF THE INVENTION

This invention relates to a method for testing an imaging device.

INTRODUCTION TO THE INVENTION

As disclosed in the above referenced applications, a Foucault knife-edge test has been traditionally understood to be perhaps the classic optical test for an objective, or imaging device.

Attention is directed to FIG. 1, which shows a typical optical assembly 10 for demonstrating the basic principles of the Foucault knife-edge test. The assembly 10 includes a conventional imaging device, i.e., a lens 12, the lens 12 comprising a pair of optical surfaces 14 and 16; a radiation source 18; a collector lens 20; and a conventional photodetector 22 comprising the human eye. The components of the assembly 10 are aligned to a reference axis 24.

For this optical assembly 10, one may employ the knife-edge test for qualitatively detecting (at the eye/photodetector 22) the presence of transverse aberrations that may have been introduced into the assembly 10 by the lens optical surfaces 14, 16. Accordingly, a knife-edge 26 may be gradually introduced into the assembly 10 (shown by way of the FIG. 1 staggered arrows), so that the knife-edge 26 sequentially cuts and blocks the image of the radiation source 18 at a plane of convergence 28. This action, in turn, removes source rays from their expected trajectories, so that a variable intensity pattern may be registered by the eye. Finally, a comparison of this intensity pattern with a theoretical intensity pattern for an ideal optical surface, can become a qualitative measure of the presence of transverse aberrations introduced by the optical surfaces 14, 16.

SUMMARY OF THE INVENTION

So far, we have stressed that the Foucault knife-edge test can provide a qualitative measure of the presence of transverse aberrations that may have been introduced by the imaging device 12. Attention is now directed to FIGS. 2 and 3, which figures help explain what we mean by a qualitative test.

In particular, FIGS. 2A, B, C, D show, in sequence, what the eye can qualitatively perceive when an ideal imaging device is subjected to the Foucault knife-edge test, and the knife-edge is sequentially advanced through four successive knife-edge positions viz:

FIG. 2A: knife-edge position 1=total non-occlusion of the radiation (no shadow);

FIG. 2B: knife-edge position 2=partial occlusion of the radiation (light, uniform shadowing);

FIG. 2C: knife-edge position 3=further occlusion of the radiation (darker, uniform shadowing);

FIG. 2D: knife-edge position 4=total occlusion of the radiation (total shadow).

In summary, FIGS. 2A-D show that, for the ideal imaging device, the eye can qualitatively perceive an ever increasing and uniform shadow pattern. We can say, moreover, that the FIG. 1 collector lens 20 can provide images of the imaging device 12 at a photodetector plane, that is, at the eye, which images are the FIGS. 2A-D shadow patterns.

Now we turn our attention to FIGS. 3A-D, which sequentially show what the eye can qualitatively perceive when a non-ideal imaging device is substituted for the FIG. 2 ideal imaging device, and is subjected to the Foucault knife-edge test. In particular, as the knife-edge is sequentially advanced through four successive knife-edge positions, the eye can sequentially and qualitatively perceive:

FIG. 3A: knife-edge position 1=total non-occlusion of the radiation (no shadow);

FIG. 3B: knife-edge position 2=partial occlusion of the radiation (light, non-uniform shadowing);

FIG. 3C: knife-edge position 3=further occlusion of the radiation (darker, more obscure shadowing);

FIG. 3D: knife-edge position 4=total occlusion of the radiation (total shadow).

In summary, FIGS. 3A-D show that, for the non-ideal imaging device, the eye can qualitatively perceive an ever increasing shadow pattern, the FIGS. 3A-D shadow patterns, in contrast to that of FIGS. 2A-D, now marked by salients i.e., various dark zones with different radii of curvature, and different centers of curvature.

Comparing, therefore, the shadow patterns provided in FIGS. 3A-D, versus those provided in FIGS. 2A-D, one skilled in the art may be enabled to say, based upon his subjective experience, that the FIG. 3 non-ideal imaging device has introduced some transverse aberrations into the assembly 10. A skilled optician may indeed be able to say more, for example, that the FIG. 3 shadow pattern suggests that the aberration is trefoil, or quadrafoil, or astigmatism. However, the skilled optician would not be able to ascertain, based on his eye's perception of the FIG. 3D shadow pattern, what quantitative measure of the transverse ray has been introduced by the non-ideal imaging device. For example, one's eye perception alone would preclude the optician from answering quantitative questions such as: how many waves of trefoil? how many waves of quadrafoil? etc.

We have now discovered, in sharp contrast to the extant literature and methods, an improved Foucault knife-edge test. The improved test of the present invention complements the qualitative test, by developing a quantitative interpretation of the imaging device's characteristics. An important advantage of our discovery, accordingly, is that the skilled optician is now enabled to quantitatively answer the questions poised above: that is, for example, the optician can now say, "the imaging device has 2.0 microradians of trefoil, or 100.0 microradians of quadrafoil."

Note that this advantage is most significant. For example, we are working in a field where there has been a long-felt need to combine the inherent advantages of a method like the sensitive, if qualitative, Foucault knife-edge method, with some sort of very high precision, quantitative method. The combination, for example, would enable one to more efficiently synthesize a desired imaging device, as opposed to merely analyzing it in a qualitative manner. The present invention, for the first time, addresses and satisfies this need.

Furthermore, our invention has a critical advantage since it can enable the skilled optician to apply, in an efficient manner, the general principles of the Foucault test to the testing of a segmented optic (in contrast to the historic testing of only a monolithic imaging device, like that of the lens 12, supra). As shown below, our quantitative capability can be exploited to resolve questions of any ambiguities that may arise in the context of the testing of the segmented optic.

The present invention, accordingly, provides a method suitable for employment in a Foucault knife-edge test assembly, the assembly comprising:

(a) an optical sample to be tested, the optical sample defining a sample space;

(b) a source of radiation directed along a reference axis to the optical sample;

(c) a detection means aligned on the source reference axis, for detecting the radiation imaged by the optical sample, the detection means defining a conjugate sample space, with respect to the optical sample space; and (d) a knife-edge capable of being positioned in a series of knife-edge position steps, for cutting the radiation imaged by the optical sample, thereby producing a variable radiation pattern in the conjugate sample space; the method comprising the steps of:

(1) determining, for each of a plurality of predetermined areas in the conjugate sample space, a radiation reference intensity parameter, based on the knife-edge positioned in a fully occluded, and fully non-occluded position;

(2) positioning the knife-edge through a sequence of discrete positioning steps for generating a family of variable radiation intensity patterns in the conjugate sample space, wherein each member of the variable radiation patterns is a function of knife-edge position, and a function of each predetermined area in the conjugate sample space; and (3) computing for each member of the family of variable radiation patterns, an interpolated knife-edge position.

BRIEF DESCRIPTION OF THE DRAWING

The invention is illustrated in the accompanying drawing, in which:

FIG. 1 shows a prior art optical assembly for using the Foucault knife-edge test;

FIGS. 2A–D show shadow patterns generated by an ideal imaging device undergoing the FIG. 1 knife-edge test;

FIGS. 3A–D show shadow patterns generated by a non-ideal imaging device undergoing the FIG. 1 knife-edge test;

FIGS. 6A–D comprise a family of curves that explain a first step of the present invention, for the case of a perfect imaging device;

FIGS. 7A–D comprise a family of curves that explain a first step of the present invention, for the case of a non-perfect imaging device;

FIGS. 8A–D comprise a family of curves generated in accordance with a second step of the present invention.

DETAILED DESCRIPTION OF THE INVENTION

We summarize above method steps suitable for employment in a Foucault knife-edge test, and capable of providing a quantitative interpretation of an imaging device's characteristics. As an aid to explaining the details of the steps of the present method, we first make some alterations to the FIG. 1 assembly, shown in FIG. 4, and provide some important comments and heuristics (FIG. 5) on the definitions recited in the summary of the present method.

Figure 4:
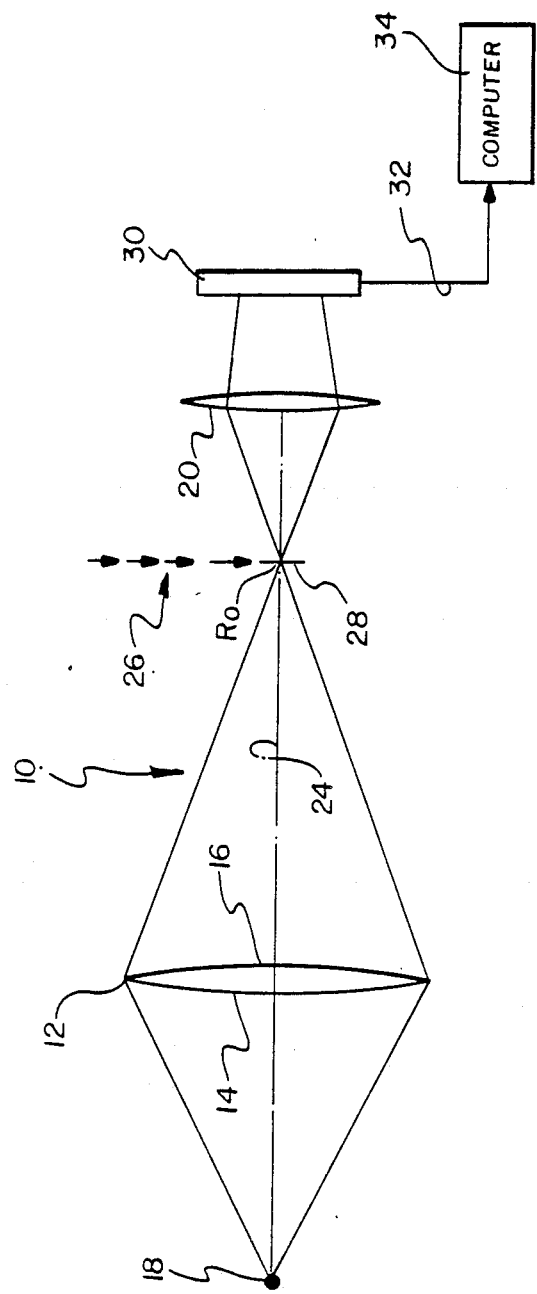
FIG. 4 shows a modified FIG. 1 optical assembly, to illustrate one embodiment of the present invention.

FIG. 4, accordingly, shows the basic FIG. 1 Foucault assembly 10, but modified to help realize the quantitative aspects of the present invention. It is first noted that the eye has been replaced by a conventional photodetector 30. For example, the photodetector 30 may comprise a matrix (m×n) array of conventional charge coupled devices (CCD) or charge injection devices (CID), where m is preferably from 64 to 1024, and n is preferably from 64 to 1024. The photodetector devices 30 can function, as is well known, to collect the radiation imaged by the imaging device 12 under test, and output, for each element in the matrix, a value proportional to the radiation intensity at that element. For our purposes, a preferred photodetector 30 comprises a CIDTEC Corporation Model No. TN 2250A2.

FIG. 4 shows that the output of the photodetector 30 may be fed along a line 32 to a conventional computing means 34. The computing means 34 preferably comprises a computer, for example, a Hewlett Packard Vectra ES.

For purposes of pedagogy, the following definitions, first summarized above, are now detailed, and reference is also made to FIGS. 4 and 5.

We have asserted that the optical sample to be tested, shown in FIG. 4 as the lens 12, defines a "sample space", and that the radiation imaged by the sample can be detected by the detection means (here, the photodetector 30), the detection means, in turn, defining a "conjugate sample space" with respect to the lens sample space.

Figure 5A:
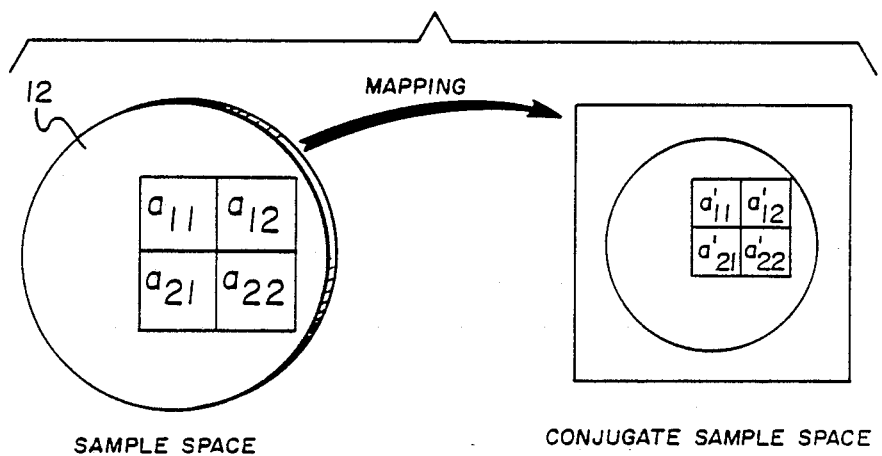
FIGS. 5A, B are heuristics to help explain definitions used in the present invention.

FIGS. 5A, B illustrate two such sample spaces, and corresponding conjugate sample spaces. In particular, the FIG. 5A definition follows from the fact that the radiation incident to the FIG. 4 photodetector 30, corresponds to the conjugate image of an entrance pupil defined by the imaging device (lens 12) under test. The FIG. 5A sample space, therefore, can be thought of as an abstract concept derived from the lens 12, where the lens 12 has been divided up into a plurality of predetermined areas comprising an array of matrix cells. In order to illustrate this concept throughout the rest of this description, we define the sample space and its conjugate sample space to each comprise a square matrix (2×2), in correspondence with a CID matrix array. Radiation imaged from each of the plurality of predetermined sample space matrix cells ($a_{11}$, $a_{12}$, $a_{21}$, $a_{22}$) may be isomorphically mapped (by way of the collector lens 20) to one of a plurality of corresponding and predetermined areas or matrix cells in the conjugate sample space ($a_{11}'$, $a_{12}'$, $a_{21}'$, $a_{22}'$).

Figure 5B:
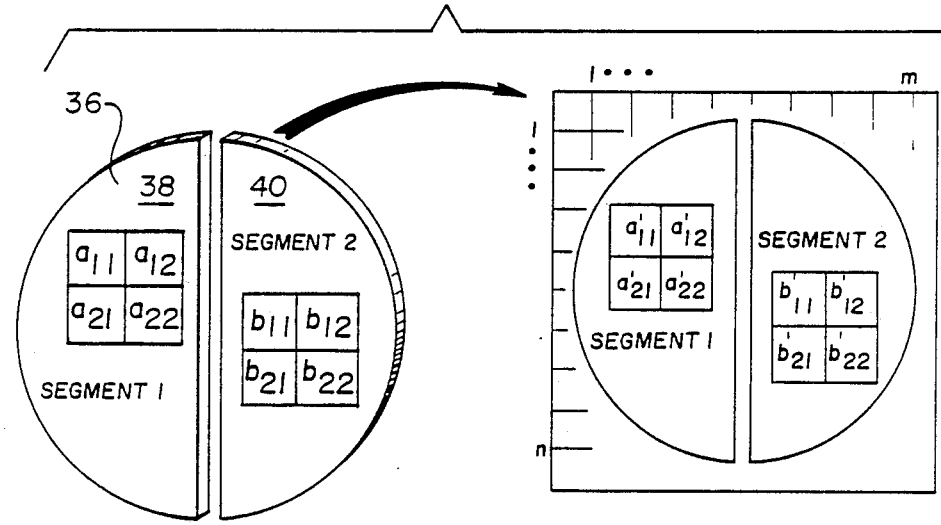

Note that the isomorphic mapping, demonstrated in relation to FIG. 5A, can be exploited to resolve the ambiguities (alluded to above) that may be attendant in testing a segmented optic 36, shown in FIG. 5B. Thus, as FIG. 5B shows, even though the segmented optic 36 has a pair of discrete portions 38, 40 in the sample space, the isomorphic mapping (i.e., the matrix [A], or the matrix [B]) can provide a unique "signature" as to which segment, 38 or 40, has generated a conjugate sample space radiation pattern.

Note further that the FIGS. 5A, B square matrices (2×2) are merely exemplary, and that in a preferred embodiment, the matrices may be enlarged to, for example, (512×512) predetermined areas.

A preferred assembly (FIG. 4) of the present method has now been set forth, as well as explanations of definitions (FIG. 5) employed in the method. We therefore turn our attention to a detailed description of each of the three method steps summarized above.

Step 1: Determining, for each of a plurality of predetermined areas in the conjugate sample space, a reference intensity parameter based on the knife-edge positioned in a fully occluded, and fully non-occluded position.

Step 1 expresses in words an idea developed mathematically in both FIGS. 6 and 7. In particular, FIG. 6 develops step 1 for the case of a perfect sample to be tested, while FIG. 7 develops step 1 for the case of a non-perfect or aberrated sample to be tested.

FIG. 6, accordingly, shows a family of curves (FIGS. 6A, B, C, D). Each of these curves corresponds to one of the plurality of four predetermined areas ($a_{11}'$, $a_{12}'$, $a_{21}'$, $a_{22}'$) in the conjugate sample space of FIG. 5A. Each of the curves, moreover, is substantially the same i.e., each provides a relationship of intensity (I) versus knife-edge position (P) for the two extreme knife-edge positions (fully non-occluded, fully occluded). Further, each of the curves is substantially piecewise linear, with a sharp break at a reference point $R_o$. $R_o$ is defined to be a reference knife-edge position, and corresponds to that point in the FIG. 4 assembly 10 where the knife-edge 26 precisely touches the reference axis 24, at the normal, thereby totally occluding the imaging device 12 to be tested.

The FIG. 6 family of curves has a piecewise linear profile, with a nearly 90° break point, and a substantial identity of form, because they have been generated, as stated, by a perfect lens. In other words, each of the predetermined areas ($a_{11}$, $a_{12}$, $a_{21}$, $a_{22}$) of the sample space of the perfect lens comprises a substantially identical radius of curvature i.e., by definition, there are no inherent aberrations in the perfect lens. Accordingly, the members of the FIG. 6 family of curves, which curves express the sample space as mapped into the conjugate sample space, are substantially identical and piecewise linear.

Continuing, step 1 requires determining, for each of the curves (FIG. 6A, B, C, D), a reference intensity parameter ($I_R$), where $I_R$ may be determined based on the knife-edge 26 being positioned first in a fully occluded, and then a fully non-occluded position (or vice versa). (Also note that the reference intensity parameter $I_R$ can be obtained by holding the knife-edge 26 in a fixed position, and moving the focused image of the radiation source 18 across the knife-edge). Since the fully occluded position corresponds to an intensity $I_{minimum} \cong 0$ watts, and the fully non-occluded position corresponds to an intensity $I_{maximum} = I_{max}$ watts (both as measured by the photodetector 30) a preferred reference intensity parameter ($I_R$) may be computed by averaging $I_{min}$ and $I_{max}$:

$$I_R = \frac{I_{max} - I_{min}}{2}. \quad (1)$$

Step 1 is now analyzed for the case where the perfect lens is replaced by a non-perfect or aberrated lens. The action of sequentially positioning the knife-edge 26 at the extreme positions, fully occluded and fully non-occluded, can generate a family of curves of the type shown in FIGS. 7A–D. Here, each of the curves corresponds to one of the plurality of four predetermined areas ($a_{11}'$, $a_{12}'$, $a_{21}'$, $a_{22}'$) in the conjugate sample space of FIG. 5A. Each of the FIG. 7 curves, however, may not be substantially the same, as they were in FIG. 6 for the case of the perfect lens. In fact, each of the curves may be arbitrary, due to arbitrary radii of curvature that indeed characterize the non-perfect lens. However, it can be stated that each of the curves in the FIG. 7 family, corresponds to a mathematical real and monotonically decreasing function, so that each of the curves continuously falls off from a maximum intensity ($I_{max}$), to some lower minimum intensity $I_{min}$.

It may be observed at this point, that a crucial advantage of the present invention is that one does not need to know the exact mathematical expression of each of the FIG. 7 curves. For the present invention, it is merely sufficient to know a finite number of sampled, discrete pairs of variables ($I_{ordinate}$, $P_{abscissa}$). This is discussed more fully below.

Finally, step 1 requires determining, for each of the curves (FIG. 7A, B, C, D), a reference intensity ($I_R$). $I_R$ may be expressed by equation (1) above, and computed in the same manner as for the perfect lens, by averaging the intensities generated by the two extreme knife-edge positions i.e., fully occluded, and fully non-occluded.

To review step 1, it should be clear that for either the perfect lens (FIG. 6) or non-perfect lens (FIG. 7), step 1 comprises generating a family of reference intensity parameters, ($I_{R1}$, $I_{R2}$, $I_{R3}$, $I_{R4}$), derived from computations computed for each of the predetermined areas in the conjugate sample space. Step 1 is preferably executed by the FIG. 4 computer 34, along the lines detailed above for both FIGS. 6 and 7. The computer 34 preferably stores in a memory the family of reference intensity ($I_R$) parameters, for subsequent operation in step 3 of the method.

Step 2: Positioning the knife-edge through a sequence of discrete positioning steps, for generating a family of variable radiation intensity patterns in the conjugate sample space, wherein each member of the family is a function of knife-edge position, and a function of each predetermined area in the conjugate sample space.

Step 2 expresses in words an idea developed mathematically in FIGS. 8A–D. In particular, FIGS. 8A–D comprise a family of four curves as generated from a non-perfect lens. Each of the curves provides an example of a function dedicated to one of the four predetermined areas ($a_{11}'$, $a_{12}{}^{12'}$, $a_{21}'$, $a_{22}'$) in the FIG. 5A conjugate sample space. Further, each function is a plot of discrete knife-edge position (P) versus radiation intensity (I). Actual sampled points (10) for each function, shown as little circles, may be generated in the following way.

First, the FIG. 4 knife-edge 26 may be positioned at a first position P=1 unit. This action, in turn, blocks some of the radiation from the source 18, so that a radiation intensity number $I_1$ may be registered by the photodetector 30, for each of the predetermined areas in the conjugate sample space. The set of intensity numbers, so generated, may be transmitted to the computer 34, along the line 32. The set of intensity numbers corresponds to a first set of sampled, discrete pairs of variables (knife-edge position ($P_1$), intensity ($I_1$)), as shown by way of the FIG. 8 little circles.

Second, the FIG. 4 knife-edge 26 may be positioned at a second position P=2 units. This action, in turn, further blocks some of the radiation from the source 18, so that a new and second set of radiation intensity numbers may be registered by the photodetector 30, again for each of the predetermined areas in the conjugate sample space. The second set of intensity numbers, so generated, may be inputted to the computer 34, along the line 32. The second set of intensity numbers corresponds to a second set of sampled, discrete pair of variables (knife-edge position ($P_2$), intensity ($I_2$)), as shown by way of the FIG. 8 little circles.

This process of re-positioning the knife-edge 26 to third, fourth, fifth position units, etc., may be repeated for any finite number of desired knife-edge 26 position units. (Note that this process can also be effected by holding the knife-edge 26 in a fixed position, and stepwise moving the focused image of the radiation source 18 across the knife-edge 26). Preferably, the re-positioning process is repeated more times, rather than fewer times, to ultimately provide a greater quantitative accuracy in the Foucault method. On the other hand, the trade-off to an exceptionally high number of process repetitions and hence greater quantitative accuracy, for example, greater than 20 repetitions, may be increased computer time or expense.

Step 3: Computing for each member of the family of variable radiation patterns, an interpolated knife-edge position.

As just detailed, the second step of the method generates a family of variable radiation patterns in the conjugate sample space. An example of the family of radiation patterns is that generated above in FIGS. 8A–D. We reprint one of these patterns (FIG. 8A), as FIG. 9, in order to illustrate the present step 3. It is to be understood that the third step, as detailed below in relation to FIG. 9, is actually repeated by the computer 34, mutatis mutandis, for each of the four predetermined areas that actually comprise the FIG. 8 family of radiation patterns.

Figure 9:
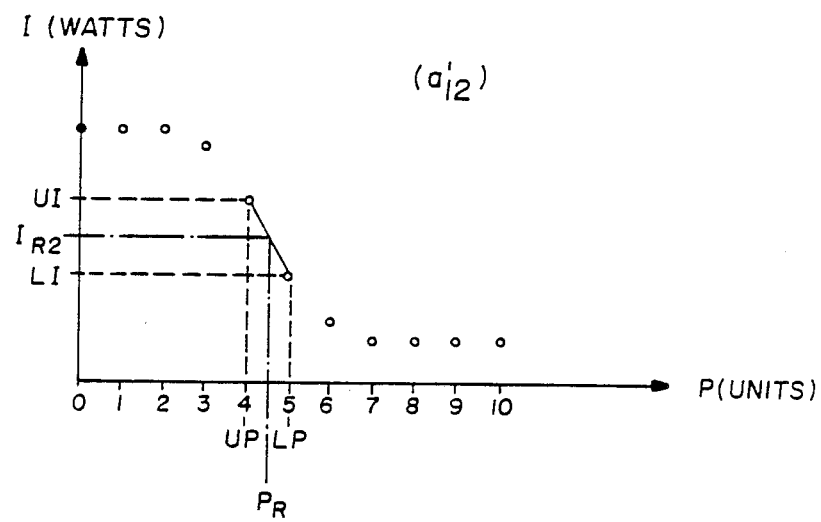
FIG. 9 is a function generated in accordance with a third step of the present invention.

FIG. 9, accordingly, comprises a radiation function for one of the predetermined areas ($a_{12}$') in the conjugate sample space. It is a plot of knife-edge position (P) versus intensity (I), with position denoted in units, and intensities denoted in watts. The little circles indicate discrete, knife-edge position sample points.

Since FIG. 9 in fact provides only discrete sample points, it should be graphically clear that a precise knife-edge position $P_R$, which corresponds to the known intensity parameter $I_R$ (from step 1), is, in the general case, unknown at this moment. It is the objective of step 3 to precisely determine $P_R$, for the following reasons.

A quantitatively precise determination of $P_R$ enables one to exploit the following equation (2), so as to arrive at a quantitative interpretation of the imaging device's characteristics:

$$\frac{P_R}{R_C} = \text{magnitude of wavefront slope aberration} \quad (2)$$

Equation (2) states that the quotient of the knife-edge position $P_R$, divided by a radius of curvature $R_C$, where $R_C$ is a measureable radius from the knife-edge 26 to a location where we choose to characterize the wavefront, namely, the surface of the imaging device 12 under test, is proportional to the magnitude of the wavefront slope aberration.

With this motivation, therefore, we return to FIG. 9 and step 3, for instructions on how to precisely determine the knife-edge position, $P_R$.

The knife-edge position $P_R$ is preferably given by the following linear, hence interpolated equation (3):

$$P_R = \frac{1}{m}(I_R - LI) + LI, \quad (3)$$

where m is the slope of a straight line between the points UI, UP and LI, LP. With reference to FIG. 9, UI is defined as an upper intensity point; LI is defined as a lower intensity point; UP is defined as an upper position point; and, LP is defined as a lower position point. More specifically, based on these definitions, the slope m may be expressed by equation (4):

$$m = \frac{UI - LI}{UP - LP}. \quad (4)$$

There remains the question, how are the variables (UI, UP) and (LI, LP) quantitatively determined? The question is preferably answered by way of the following program/example.

First, for each discrete, sampled point in the FIG. 9 curve, a comparison is made as to whether or not the intensity I is greater than the known intensity parameter $I_R$ (from step 1). If I is greater than $I_R$, the program stores in memory the immediate values of intensity (UI) and position (UP), and then advances to the next discrete, sampled point. Assume now, that this value I is below that of $I_R$. Then, the program recalls from memory the last stored values, namely, UI and UP, and saves the immediate intensity and position, as LI and LP, respectively. In review, these numbers (UI, UP) and (LI, LP), are processed through equations (4), (3) and (2) supra, to arrive at the quantitative interpretation of the imaging device's characteristics.

Note finally, that the numbers (UI, UP) and (LI, LP), may be generated, in an alternative reverse procedure, from that just specified. Thus, by now working backwards, along the FIG. 9 curve, from the more fully occluded knife-edge position, to the less fully occluded knife-edge position, one can equivalently determine when I is, for the first time, greater than $I_R$. This occurrence signifies the point to register the values of (UI, UP) and (LI, LP), for insertion in equations (4), (3), and (2) supra.

APPENDIX

A computer program in accordance with the three steps of the present method, as specified above and in the Figures, written in C language, is now listed.

It is claimed:

STEP 1
```
/*******************************************************************/
/*                                                                 */
/*         function  do_initialization...                          */ void do_initialization(FILE *hi_val, FILE *lo_val,FILE *hi_pos,FILE *lo_pos,
                           short *x_center,short *y_center,float *outer_radius,
                           float *inner_radius, char *optical_setup)

{ unsigned char   pixel_value, hi_average, low_average;
        unsigned char   one_row[512], max_pixel;
        short           row, col, cutoff, max_row;
        long            pixel_count, total,offset;

max_row = 479;

scroll(3);
        printf("Please cutoff source so I can take a dark reading. Hit 'g' when ready.\n");
        while(getch() != 'g')  ; /* wait here for 'g' */ avg_frames(no_of_frames);
        cframe(FB0,FB0,ALOW,B1);/* copy result to B1*/ fb_access(FRAMEB,NOSCAN,SCAN);

fb_settmode(Z_MODE);
        video(); /* return to normal viewing mode */
        printf("Please wait for a moment.\n");

max_pixel = 0; /* initialize max pixel value */
        for(row = 0; row <= max_row ; row++)
        { fb_rhline(B1,0,row,512,one_row);/* read in a row at a time */
           for(col=0;col< 512;col++)

if(one_row[col] > max_pixel) max_pixel = one_row[col];
              /* if bigger than max pixel replace */
        } /* max pixel has been found */
        cutoff = max_pixel + 25 ; /* leave room for noise */ scroll(3);

printf("Please set up system full open. Ajust system to get desired image on the camera\n");
        printf("When you are ready to do the hi value grab hit 'g'\n");
        while (getch() != 'g') ;/* wait here til g is hit */ avg_frames(no_of_frames); /* go have system grab a frame */
        adi_cpssel(VDC,VDAL,VDAL,VDAL);
        fb_access(FRAMEA,SCAN,NOSCAN); /*set to read FRAMEB */
        fb_settmode(Z_MODE);

total = 0; /* initialize value of summ of all pixels */
        pixel_count = 0;

for(row=0;row<=max_row;row++)
        { fb_rhline(ALOW,0,row,512,one_row);/* read in a row at a time */
              for(col=0;col< 512;col++)
              { if(one_row[col] < cutoff )
                    status_array[row][col] = 0; /* identify pixel as not being used */
                 else
                 {
                      status_array[row][col] = 1; /* set pixel flag to indicate low
                                                     value */
```

```
          total += one_row[col];
          pixel_count++;
      }
    }
    if( (row % 100) == 0 ) printf("Row %4d done.\n",row);
    /* print status or every 100th row */

} /* pixels stored and active ones identified */
  hi_average = total/pixel_count;

avg_a_and_b1(); /* average the two averages */
  cframe(FB0,FB0,ALOW,B2); /* copy average to B2*/
  fb_setsmask(FRAMEB,0xFF00); /*protect B2 */
  fb_access(NONE,SCAN,SCAN);
  fb_vbsel(B2);
  adi_cpssel(VDC,VDB,VDB,VDB);
  printf("On the monitor is a display of your average values. Hit a key to p
roceed. \n");
  getch();

identify_segments(cutoff); /* go and define segments if required */ video();

scroll(10);
  average_mid_point = hi_average/2;
  /*threshold_output_luts(1,mid_average); /* binarize output lut 1 to*/
  scroll(5);
  printf("The high and low values are stored please wait while I find the im
age boundaries.\n");
  find_boundaries(x_center,y_center,outer_radius);

scroll(10);
  printf("I will now locate the obstructions.\n");

find_obstruction(*x_center,*y_center, top, bottom, left,right,
                   *outer_radius);
  printf("Here is a mapping of your working space..\n");
  show_area();

/*reduce_aperture(*y_center,*x_center,*outer_radius);  */
  /*reduce the aperture if desired*/

/*pad_obstructions();*/
  /*put a dead area around obstructions */
}
/*
/*                                                                         */
/***************************************************************************/
/*
/*            function ... save_midpoints()                                */
                                                                          */
  void save_midpoints(FILE *hi_file, FILE *lo_file)

{
  int          row, col;
  unsigned char  pixel, hi_avg, lo_avg;
  long         offset;

fb_access(FRAMEB,SCAN,NOSCAN); /* set up B2 to store values */
  for(row=0;row<=511;row++)
  {
    printf("Starting row# %4d...",row);
    for(col=0;col<=511;col++)
    {
      if(status_array[row][col] == 0)
        fb_wpixel(B2,col,row,0);
      else
      {
```

```c
            offset = 512*row + col; /* calc position for file pointer */
            fseek(hi_file, offset, SEEK_SET); /* move pointers to */
            fseek(lo_file, offset, SEEK_SET); /* correct location */
            fread(&hi_avg, 1, 1, hi_file); /* read in high value */
            fread(&lo_avg, 1, 1, lo_file); /* read in low value */
            pixel = (hi_avg-lo_avg)/2; /* calc avg */
            fb_wpixel(B2,col,row,pixel); /* store the value in B2 */
        }
    }
    printf("completed.\n");
}
                                                                    */
/*                                                                  */
/*
/**************************************************************/
```

STEP 2

```c
/**************************************************************/
    signed char huge   status_array[512][512];/* array to define status of point*
/
    /* create a global array to be used for intermediate processing
       of the image array at any point in time. */

FILE        *hi_value, *lo_value, *hi_position, *lo_position;
    FILE        *Ex, *Ey;
    FILE        *Side1, *Side2;
    int         top, bottom, left, right; /* variables showing working area */
    extern int  bur_AX, DDD;              /* global variables for inchworm
*/
    extern float  bur_datapassed;         /* these are in the driver to be
linked */
    float       microns_per_step, microinches_per_step;
    float       average_mid_point;
    int         no_of_frames, reference_row, reference_col;
    float       avg_mid_point;
    long int    number_of_active_pixels=0, ignored_pixels=0;
    double      Ex_half_1 =0,Ex_half_2 = 0,Ey_half_1=0,Ey_half_2 =0;
    long int    Pixels_in_one =0, Pixels_in_two = 0;

main() /* start of main procedure */
{
    unsigned char  bin_val, ch;
    short       row, col, step, record_number, max_row, max_col;
    short       min_row, min_col,i, j, line, no_to_avg;
    short       no_of_steps,steps_moved;
    long int    total_completed;
    char        direction, at_start, all_pixels_done, view_type;
    int         average_midpoint,boundary;
    float       start_ratio = 0.0075; /*% of pixels which have to switch to st
art */
    float       stop_ratio  = 0.9925; /* % of pixels which have to switch to s
top */

/* pointers to the files containing the data */ scroll(25);
    printf("This is the Knife Edge Test program. Please get all of the equipment\
n");
    printf("ready then hit any key.");
    ch=getch(); /* wait here for key to be hit */ printf("Now we are ready to start the test. How many frames do you want to\n"
);
    printf("average at each step.\n");

scanf("%i",&no_of_frames); /* read in the number to average */ setup_the_system(); /* go do the initialization routine to get midpoints */
    save_configuration();
```

```
    printf("\nThe total number of active pixels before padding is %ld \n",number_of_active_pixels);

/* number_of_active_pixels = number_of_active_pixels-ignored_pixels;

printf("Total number of active pixels after padding is  %ld\n",number_of_active_pixels); */
    printf("Average mid point value = %f.\n",average_mid_point);
    boundary = (int)average_mid_point; /* convert to int */
    printf("Hit a key to continue.\n");
    getch();

video(); /* get video image on screen */ scroll(5);    /* advance 5 lines */
    printf("Good. I will now find the position of best focus. Please manually position\n");
    printf("the knife at a place in front of the focus close to the edge of the beam.\n");
    printf("When you are ready to have me locate the focus hit any key.\n");
    ch=getch(); /* wait here for response */ scroll(25); /*clear screen */
    printf("                  ---------------------------------------------\n");
    printf("\n");
    printf("                  LOCATE KNIFE AT FOCUS.. HIT A KEY WHEN DONE\n");
    printf("\n");
    printf("                  ---------------------------------------------\n");

getch();

scroll(25);
    printf("What do you want for your step size in microns(0.1 micron res) ?");
    scanf("%f",µns_per_step);
    microinches_per_step = 39.4*microns_per_step*sqrt(2)/2;/* since knife is at 45 deg */
    printf("\n");

/***** call setup to burleigh here ****/
    init(); /* initialize burleigh system */ bur_AX = -1 ; /* make direction be negative.. ie in direction for testing */
    DDD =-1;
    bur_datapassed = 5*microns_per_step;
    check_direction();
    travel(); /* set up the actual travel per step */ view_type = 'x';
    while(view_type == 'x')
    {
      printf("\n\nDo you want live image(l) or averaged image(a) on the screen?");
      view_type = getche();
      if((view_type != 'l') && (view_type != 'a'))
      {
        printf("\nPlease respond with an 'l' or an 'a'!\n");
        view_type = 'x';
      }
    } scroll(5);
    printf("Position the knife just outside the caustic.\n");

printf("Hit s to start the test.\n");
    while((ch=getche()) != 's') printf("\n"); /* keep looking for s */ scroll(25);
    printf("Here we go.... \n\n");

/* do the iterations for each step */
    threshold(ADI,GREEN,0,255,boundary); /* binarize display at mid value */ direction = 'x';
```

```
   at_start = 'n' ;/* initialize flag for knife at start position */
   while(at_start == 'n')
   {
     mvstep();   /* move knife 1 step */
     avg_frames(no_of_frames);/* average the frames into frame A */
     if(view_type == 'l')
     {
       select_path(LOOP_BACK);
       vsi_aq(CONTINUOUS,0);
     }
     total_completed = quick_advance(direction);
     if(total_completed > (long int)(start_ratio*number_of_active_pixels))
       at_start = 'y';

} /* if any pixel has changed due to knife movement you are at edge of caust
ic */ printf("\n\n\n I have located the edge of the beam I will now start.\n");

swtch_direction(); /*change direction of knife */
   for(steps_moved =1; steps_moved<=1; steps_moved++)
       mvstep(); /* move back 1 steps */
   swtch_direction(); /*go back to original direction */ all_pixels_done = 'n'; /* set flag to indicate all pixels are not done */
   steps_moved = 0; /* initialize # of steps moved */
   total_completed = 0 ;/* initialize total number of pixels completed */
   direction = 'x';
   bur_datapassed = microns_per_step;
   check_direction();
   travel(); /* set up correct travel per step */ while(all_pixels_done == 'n')
   {
     mvstep(); /*move knife one step */
     printf("Working on step # %5d. \n",steps_moved+1);
     steps_moved++;
     avg_frames(no_of_frames);
     if(view_type == 'l')
     {
       select_path(LOOP_BACK);
       vsi_aq(CONTINUOUS,0);
     }
     check_for_crossovers(&total_completed,steps_moved,direction);
     printf("total completed = %ld \n",total_completed);

if(total_completed >= (long int)((1-start_ratio/5)*number_of_active_pixels
))
         all_pixels_done = 'y'; /* then indicate that all pixels are done */ if(total_completed <= (long int)(start_ratio*number_of_active_pixels))
         steps_moved = 0; /* define 0 step to be at start of data change */

} /* this cut in one direction is done */ find_transverse_ray_aberrations(direction);

/* now to step over to position for other cut */ direction = 'y';
   bur_datapassed = 5*microns_per_step;
   check_direction();
   travel(); /* set up bigger steps to find start */
   total_completed=0;
   at_start = 'n' ;/* initialize flag for knife at start position */
   while(at_start == 'n')
   {
     mvstep();   /* move knife 1 step */
     avg_frames(no_of_frames);/* average the frames into frame A */
     if(view_type == 'l')
     {
      select_path(LOOP_BACK);
      vsi_aq(CONTINUOUS,0);
```

```
    }
    total_completed = quick_advance(direction);
    if(total_completed > (long int)(start_ratio*number_of_active_pixels))
        at_start = 'y';
} /* if any pixel has changed due to knife movement you are at edge of caust
ic */ swtch_direction();
for(steps_moved =1; steps_moved<=1; steps_moved++)
    mvstep(); /* move back 5 steps */
swtch_direction();

all_pixels_done = 'n'; /* set flag to indicate all pixels are not done */
steps_moved = 0; /* initialize # of steps moved */
total_completed = 0 ;/* initialize total number of pixels completed */
bur_datapassed = microns_per_step;
check_direction();
travel(); /* set travel to desired amount */ while(all_pixels_done == 'n')
{
   mvstep();    /*move knife one step */
   printf("Working on step # %5d. \n",steps_moved+1);
   steps_moved++;
   avg_frames(no_of_frames);
   if(view_type == 'l')
   {
     select_path(LOOP_BACK);
     vsi_aq(CONTINUOUS,0);
   }
   check_for_crossovers(&total_completed,steps_moved,direction);
   printf("total completed = %ld \n",total_completed);
   if(total_completed >= (long int)(stop_ratio*number_of_active_pixels))
        all_pixels_done = 'y'; /* then indicate that all pixels are done */ if(total_completed <= (long int)(start_ratio*number_of_active_pixels))
        steps_moved = 0; /* make the start the point at which data changes */
} /* this cut in one direction is done */ find_transverse_ray_aberrations(direction);
scroll(25);

fwrite(&Ex_half_1,4,1,Side1);
fwrite(&Ey_half_1,4,1,Side1); /*save avg Ex and Ey for side 1 */
fwrite(&Ex_half_2,4,1,Side2);
fwrite(&Ey_half_2,4,1,Side2); /*save avg Ex and Ey for side 2 */
fclose(Side1);
fclose(Side2);

printf("The testing is done.\n");

printf("Ok all of the data is saved. The file names are as follows: \n");
printf("\n Ex -> X Transverse Ray Aberrations.");
printf("\n Ey -> Y Transverse Ray Aberrations.\n");
printf("\n To reconstruct the surface run 'opd_map'.\n");
printf("\n After that you can determine the aberrations by running 'zernike'\
n");

printf(" to determine the zernike aberrations or 'rigidbdy' to determine\n");
printf(" the rigid body components.\n");
fprintf(stdprn,"\f\n\n\n\n\r");
    fprintf(stdprn,"Side 1 avgerage Ex = %12.6g      Side 1 average Ey = %12.6g \n
\n\r",Ex_half_1,Ey_half_1);
    fprintf(stdprn,"Side 2 avgerage Ex = %12.6g      Side 2 average Ey = %12.6g \n
\n\n\n\n\n\n\r",Ex_half_2,Ey_half_2);

} /*end of test program */
/*                                                                            */
/*                                                                            */
/****************************************************************************/
```

STEP 3

```
/*********************************************************************/
/*                                                                   */
/*      function  find_transverse_ray_aberrations() .. to do the calcs */
/*                from the four data files from the test to calc Ex, Ey */ void    find_transverse_ray_aberrations(char  direction)
/*
        direction  -> which cut this is  */

{
        FILE            *output_file; /*pointer to output data file */
        unsigned char   mid_point_row[512], hi_values[512], lo_values[512];
        short           hi_positions[512], lo_positions[512];
        float           transverse_aberrations[512]; /* row of output data */
        float           zero_line[512], slope, reference_aberration;
        int             row, col, array_size =512;
        long int        position_offset, value_offset;

scroll(10);
        printf("Please wait while I calculate the %c transverse ray aberrations.
.\n",direction);

reference_aberration = calc_reference_aberration(direction);
        for(col=0; col<512; col++)
          {
           zero_line[col] = 0;/*set up a reference line */
           transverse_aberrations[col] = 0;
          }
        if(direction == 'x')
          {
           for(row=top; row<= bottom; row++) /*fill the top with 0's */
            {
            printf("Doing row # %3d \n",row);

position_offset = pointer_offset(row,0,2,512);/* find offset in two
byte file */
        value_offset    = pointer_offset(row,0,1,512);/* find offset in one
byte file */
        fseek(lo_position,position_offset,SEEK_SET);
        fseek(hi_position,position_offset,SEEK_SET);
        fseek(lo_value,value_offset,SEEK_SET);
        fseek(hi_value,value_offset,SEEK_SET);

fread(lo_positions,sizeof(lo_positions),1,lo_position);
        fread(hi_positions,sizeof(hi_positions),1,hi_position);
        fread(lo_values,sizeof(lo_values),1,lo_value);
        fread(hi_values,sizeof(hi_values),1,hi_value);
          /* read a line of data in from each file */ fb_rhline(B2,0,row,512,mid_point_row); /* read in the row of mid poi
nts */ for(col=left; col<=right; col++) /*in the active area */
          { if((abs(status_array[row][col])!=3) && (status_array[row][col]
!= 0))
               {
               if(hi_values[col] != lo_values[col])
                 { slope = ((float)hi_positions[col] - (float)lo_positions[col])/
((float)hi_values[col]-(float)lo_values[col]);
                transverse_aberrations[col] = slope*((float)mid_point_row[col]
-(float)lo_values[col])+(float)lo_positions[col];
                /* this gives the transverse ray aberration in steps*/
                transverse_aberrations[col] = microinches_per_step*transverse_
aberrations[col];
                transverse_aberrations[col] = transverse_aberrations[col]-refe
rence_aberration;
                if(status_array[row][col] == 2)
```

```c
            {
                Ex_half_1 = Ex_half_1+transverse_aberrations[col];
                Pixels_in_one++;  /* increment pixel count */
            }
            if(status_array[row][col] == -2)
            {   Ex_half_2 =Ex_half_2 +transverse_aberrations[col];
                Pixels_in_two++;  /* increment pixel count */
            }
        }
        else
        {
            printf("Error at col # %3d. Hi_value= %3d  lo_value= %3d \n",col,hi_values[col],lo_values[col]);
            transverse_aberrations[col] = transverse_aberrations[col-1];
        }
        }
    } write_data_to_file(transverse_aberrations, direction, row);
    /*save this row */ memcpy(transverse_aberrations,zero_line,sizeof(transverse_aberrations));
    /*re-zero out the line of transverse_aberrations */

}/*end of row loop */
    Ex_half_1 = Ex_half_1 /Pixels_in_one;
    Ex_half_2 = Ex_half_2 /Pixels_in_two; /* calc average */
}
else
{
  Pixels_in_one = 0; /* reinitialize */
  Pixels_in_two = 0;

for(col=left; col<right; col++) /*fill the top with 0's */
  {
    printf("Doing col # %3d \n",col);

position_offset = pointer_offset(col,0,2,512);/* find offset in two byte file */
    value_offset    = pointer_offset(col,0,1,512);/* find offset in one byte file */
    fseek(lo_position,position_offset,SEEK_SET);
    fseek(hi_position,position_offset,SEEK_SET);
    fseek(lo_value,value_offset,SEEK_SET);
    fseek(hi_value,value_offset,SEEK_SET);

fread(lo_positions,sizeof(lo_positions),1,lo_position);
    fread(hi_positions,sizeof(hi_positions),1,hi_position);
    fread(lo_values,sizeof(lo_values),1,lo_value);
    fread(hi_values,sizeof(hi_values),1,hi_value);
    /* read a line of data in from each file */ fb_rvline(B2,col,0,512,mid_point_row); /* read in the row of mid points */ for(row=top; row<=bottom; row++) /*in the active area */
    { if((abs(status_array[row][col])!=3) && (status_array[row][col] != 0))
      {
        if(hi_values[row] != lo_values[row])
        {
          slope = ((float)hi_positions[row] - (float)lo_positions[row])/((float)hi_values[row]-(float)lo_values[row]);
          transverse_aberrations[row] = slope*((float)mid_point_row[row]-(float)lo_values[row])+(float)lo_positions[row];
          /* this gives the transverse ray aberration in steps*/
          transverse_aberrations[row] = microinches_per_step*transverse_aberrations[row];
          transverse_aberrations[row] = transverse_aberrations[row]-reference_aberration;
          if(status_array[row][col] == 1)
```

```
            {
                Ey_half_1 =Ey_half_1+transverse_aberrations[row];
                Pixels_in_one++;
            }
            if(status_array[row][col] == -1)
            {
                Ey_half_2 = Ey_half_2+transverse_aberrations[row];
                Pixels_in_two++;
            }
        }
        else
        {
            printf("Error at row # %3d. Hi_value= %3d  lo_value= %3d \n",
row,hi_values[row],lo_values[row]);
            transverse_aberrations[row] = transverse_aberrations[row-1];
        }
        }
    } write_data_to_file(transverse_aberrations, direction, col);
        /*save this row */ memcpy(transverse_aberrations,zero_line,sizeof(transverse_aberration
s));

/*re-zero out the line of transverse_aberrations */
    }/*end of  for activ area */

Ey_half_1 = Ey_half_1/Pixels_in_one;/*calc averages */
    Ey_half_2 =Ey_half_2/Pixels_in_two;

}/*end of y direction loop */
}/*end of function */

/*                                                                          */
/*                                                                          */
/****************************************************************************/
```

1. A method suitable for employment in a Foucault knife-edge test assembly, the assembly comprising:
   (a) an optical sample to be tested, the optical sample defining a sample space;
   (b) a source of radiation directed along a reference axis to the optical sample;
   (c) a detection means aligned on the source reference axis, for detecting the radiation imaged by the optical sample, the detection means defining a conjugate sample space, with respect to the optical sample space; and
   (d) a knife-edge capable of being positioned in a series of knife-edge position steps, for cutting the radiation imaged by the optical sample, thereby producing a variable radiation pattern in the conjugate sample space; the method comprising the steps of:
   (1) determining, for each of a plurality of predetermined areas in the conjugate sample space, a radiation reference intensity parameter, based on the knife-edge positioned in a fully occluded, and fully non-occluded position;
   (2) positioning the knife-edge through a sequence of discrete positioning steps for generating a family of variable radiation intensity patterns in the conjugate sample space, wherein each member of the variable radiation patterns is a function of knife-edge position, and a function of each predetermined area in the conjugate sample space; and
   (3) computing for each member of the family of variable radiation patterns, an interpolated knife-edge position.

2. A method according to claim 1, comprising determining the reference intensity parameter by the step of averaging the intensity values generated by positioning the knife-edge in a fully occluded, and fully non-occluded position.

3. A method according to claim 1, comprising positioning the knife-edge through at least 20 discrete positioning steps.

4. A method according to claim 1, comprising computing a linear interpolated knife-edge position, derived from slope information, at a knife-edge position corresponding to the step 1 reference intensity parameter.

* * * * *

UNITED STATES PATENT AND TRADEMARK OFFICE
CERTIFICATE OF CORRECTION

PATENT NO. : 4,969,737
DATED : Nov. 13, 1990
INVENTOR(S) : William D. Humbel et al.

It is certified that error appears in the above-identified patent and that said Letters Patent is hereby corrected as shown below:

Col. 6, line 5    Delete " $I_R = \frac{I_{max} - I_{min}}{2}$. " and substitute therefor -- $I_R = \frac{I_{max} + I_{min}}{2}$ --;

Col. 6, line 63   Delete "$a_{12}^{12'}$" and substitute therefor -- $a_{12}'$ --.

Signed and Sealed this

Ninth Day of June, 1992

Attest:

DOUGLAS B. COMER

Attesting Officer

Acting Commissioner of Patents and Trademarks